(12) United States Patent
Hitsuyu et al.

(10) Patent No.: US 12,092,223 B2
(45) Date of Patent: Sep. 17, 2024

(54) THROTTLE VALVE DEVICE AND METHOD FOR MANUFACTURING THE SAME

(71) Applicant: DENSO CORPORATION, Kariya (JP)

(72) Inventors: Keina Hitsuyu, Tokoname (JP); Tohru Shimizu, Tokoname (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 18/191,038

(22) Filed: Mar. 28, 2023

(65) Prior Publication Data

US 2023/0400103 A1  Dec. 14, 2023

(30) Foreign Application Priority Data

Jun. 10, 2022  (JP) .................................. 2022-094607

(51) Int. Cl.
*F16K 1/22* (2006.01)
*F16K 27/02* (2006.01)
*F16K 31/04* (2006.01)

(52) U.S. Cl.
CPC .......... *F16K 1/221* (2013.01); *F16K 27/0218* (2013.01); *F16K 31/047* (2013.01)

(58) Field of Classification Search
CPC .... F16K 1/221; F16K 37/0033; F16K 31/043; F16K 31/535; F16K 31/047; F02D 9/1065
See application file for complete search history.

(56) References Cited

U.S. PATENT DOCUMENTS

| | | | | |
|---|---|---|---|---|
| 4,961,355 A | * | 10/1990 | Irino | F02D 11/10 74/513 |
| 5,429,090 A | * | 7/1995 | Kotchi | F02D 9/02 123/399 |
| 5,509,396 A | * | 4/1996 | Tamaki | F02D 9/02 123/400 |
| 6,745,994 B2 | * | 6/2004 | Klug | F02D 9/1065 74/2 |
| 6,918,374 B1 | * | 7/2005 | Kurita | F02M 19/128 123/399 |
| 6,997,430 B2 | * | 2/2006 | Denning | F16K 31/047 251/71 |

(Continued)

FOREIGN PATENT DOCUMENTS

JP  2003-120335 A  4/2003
JP  2020-097908 A  6/2020

*Primary Examiner* — Umashankar Venkatesan
(74) *Attorney, Agent, or Firm* — Harness, Dickey & Pierce, P.L.C.

(57) ABSTRACT

A coil spring of a throttle valve device around a shaft between a valve and a valve gear has one end rotated together with a first guide, and another end rotated together with a second guide. The both ends of the coil spring contact a holding portion and a driving portion at a valve intermediate position of the shaft. The driving portion pushes the one end of the coil spring while the holding portion holds the other end of the coil spring during movement of the shaft from the valve intermediate position toward a valve fully-open position or a valve fully-closed position. The first guide and the second guide have insertion holes that face each other in an axial direction when the both ends of the coil spring are positioned near the valve intermediate position of the shaft and are not in contact with the holding portion.

8 Claims, 13 Drawing Sheets

(56) References Cited

U.S. PATENT DOCUMENTS

| | | | | |
|---|---|---|---|---|
| 7,073,483 | B1* | 7/2006 | Kurita | F16K 1/221 |
| | | | | 123/337 |
| 7,143,993 | B2* | 12/2006 | Everingham | F02M 26/54 |
| | | | | 123/568.24 |
| 7,543,794 | B2* | 6/2009 | Kouzu | F02M 23/006 |
| | | | | 251/250.5 |
| 8,448,627 | B2* | 5/2013 | Kondo | F02D 9/105 |
| | | | | 123/399 |
| 10,215,301 | B2* | 2/2019 | Kwasniewski | F16K 31/043 |
| 10,330,025 | B2* | 6/2019 | Noumura | F16K 1/224 |
| 10,428,889 | B2* | 10/2019 | Higuchi | F16F 1/06 |
| 10,533,676 | B2* | 1/2020 | Kokubu | F16K 31/043 |
| 11,041,449 | B2* | 6/2021 | Guiduzzi | F02D 9/1065 |
| 11,248,714 | B2* | 2/2022 | Higuchi | F16K 31/043 |
| 11,306,665 | B2* | 4/2022 | Yamaguchi | F02D 9/1065 |
| 11,401,872 | B2* | 8/2022 | Higuchi | F02D 9/08 |
| 2017/0146144 | A1* | 5/2017 | Gautier | F02M 26/67 |
| 2021/0054791 | A1* | 2/2021 | Ishihara | F16K 31/041 |
| 2021/0285388 | A1 | 9/2021 | Higuchi et al. | |
| 2024/0044295 | A1* | 2/2024 | Kimura | F02D 9/1065 |

* cited by examiner

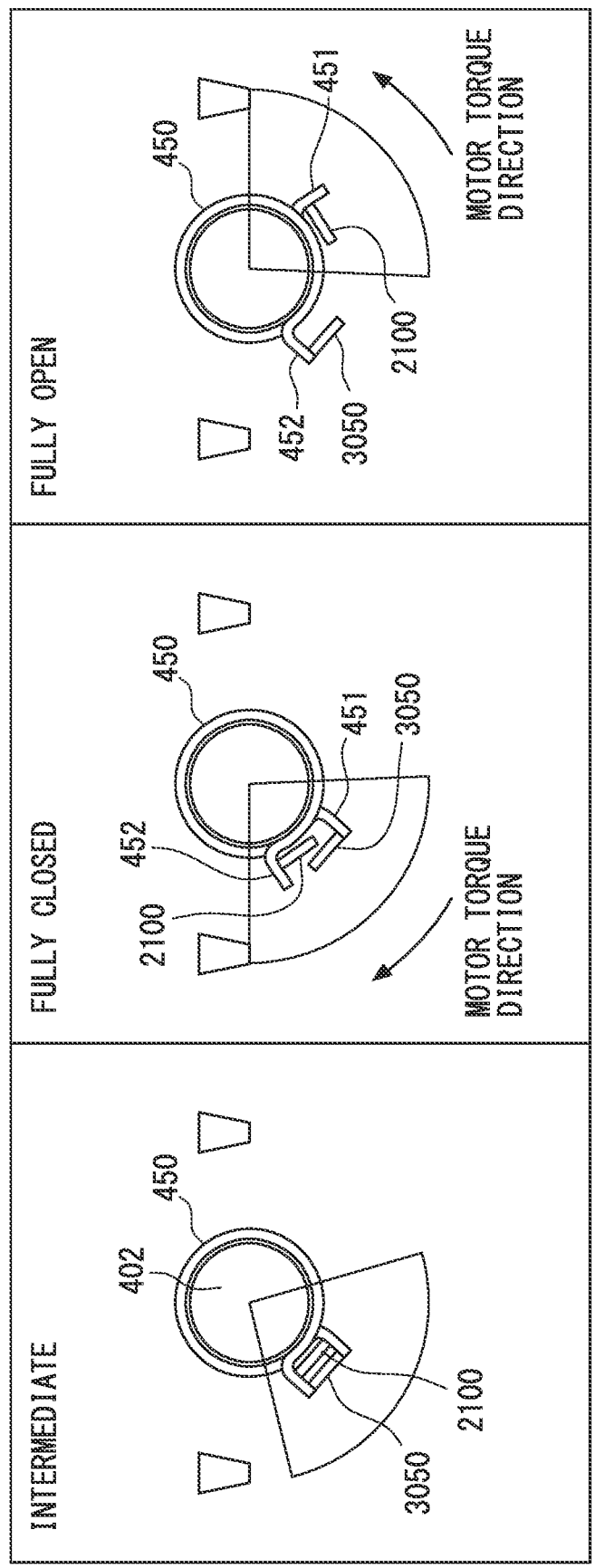

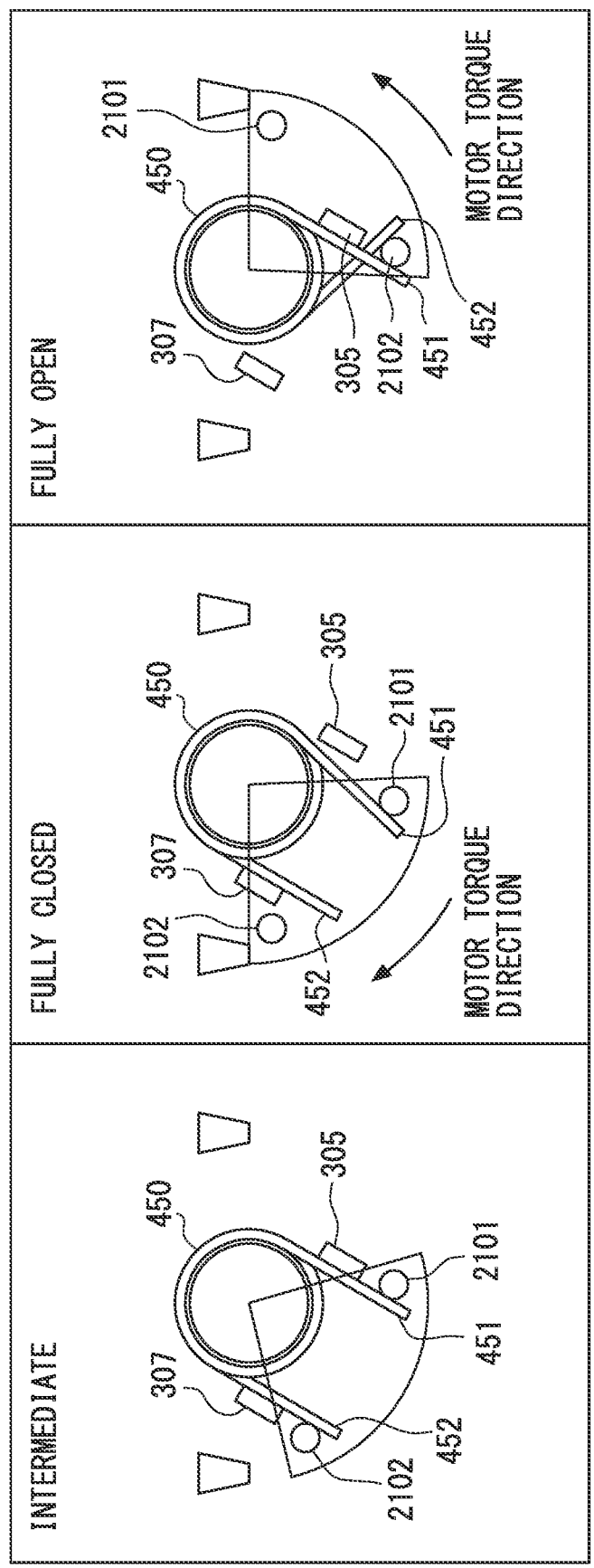

THROTTLE VALVE DEVICE AND METHOD FOR MANUFACTURING THE SAME

CROSS REFERENCE TO RELATED APPLICATION

This application is based on and incorporates herein by reference Japanese Patent Application No. 2022-094607 filed on Jun. 10, 2022.

TECHNICAL FIELD

The present disclosure relates to a throttle valve device and a method for manufacturing the throttle valve device.

BACKGROUND

In an electronic throttle device, a coil spring is used, and guides are arranged at opposite ends of the coil spring. A first spring end and a second spring end of the coil spring are engaged with a driving portion of a valve gear. Accordingly, a valve gear subassembly in which the valve gear and the coil spring are joined with each other is assembled.

SUMMARY

A throttle valve device according to at least one embodiment of the present disclosure includes: a body having a passage and a motor space; a valve arranged in the passage of the body and configured to rotate together with a shaft to open and close the passage; and a motor held in the motor space of the body and configured to operate according to an electric signal and rotate the shaft via rotation of a valve gear such that the shaft is located at a valve fully-closed position at which the valve is fully closed, a valve fully-open position at which the valve is fully open, or a valve intermediate position which is between the valve fully-closed position and the valve fully-open position. The throttle valve device according to the first aspect of the present disclosure further includes: a coil spring arranged around an outer circumference of the shaft in the body and located between the valve gear and the valve, the coil spring having a first spring end extending outward in a radial direction of the coil spring at an end of the coil spring, and a second spring end extending outward in the radial direction at another end of the coil spring, the coil spring being configured to generate a spring force as an opposing force at a time of transmission of rotation from the motor to the shaft; a first guide having a first through hole through which the shaft extends at a central position of the first guide, a first end surface of the coil spring facing the first guide, the first guide being configured to rotate around the shaft together with the first spring end; and a second guide having a second through hole through which the shaft extends at a central position of the second guide, a second end surface of the coil spring facing the second guide, the second guide being configured to rotate around the shaft together with the second spring end. The throttle valve device according to the first aspect of the present disclosure further includes: a driving portion configured to be rotated together with the valve gear, the driving portion being in contact with the first spring end and the second spring end at the valve intermediate position of the shaft, the driving portion pushing the first spring end or the second spring end against the opposing force of the coil spring during a first movement of the shaft or a second movement of the shaft, the first movement being movement of the shaft from the valve intermediate position to the valve fully-closed position, the second movement being movement of the shaft from the valve intermediate position to the valve fully-open position; and a holding portion provided in the body, the holding portion being in contact with the first spring end and the second spring end at the valve intermediate position of the shaft, the holding portion holding the first spring end or the second spring end during the first movement or the second movement of the shaft. The first guide includes a first insertion hole, and the second guide includes a second insertion hole. An axis of the first insertion hole in an axial direction of the shaft and an axis of the second insertion hole in the axial direction are located at the same position when both the first spring end and the second spring end are positioned near the valve intermediate position of the shaft and are not in contact with the holding portion.

BRIEF DESCRIPTION OF DRAWINGS

The details of one or more embodiments are set forth in the accompanying drawings and the description below. Other features and advantages will be apparent from the description and drawings, and from the claims.

FIG. 11 is a diagram for explaining change in position of the coil spring.

FIG. 15 is a diagram for explaining change in position of a coil spring.

DETAILED DESCRIPTION

Figure 1:
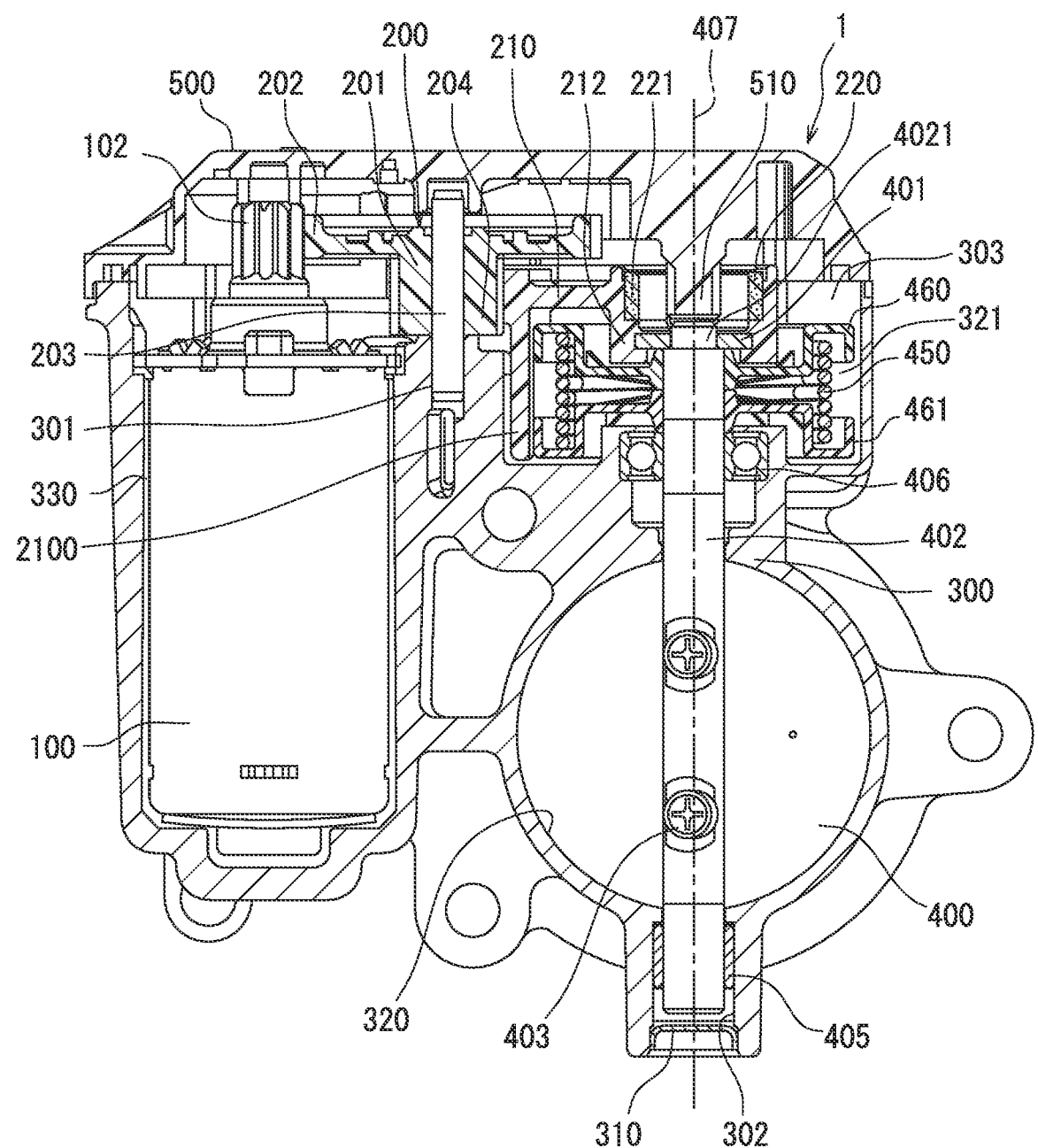
FIG. 1 is a vertical cross-sectional view of an electronic throttle device.

To begin with, examples of relevant techniques will be described. A throttle valve device according to the present disclosure may be applicable, for example, in an electronic throttle device for controlling intake air of an engine, an EGR valve used in an exhaust gas circulation system, a pressure control valve in an intake passage for a diesel engine, and a negative pressure control valve for controlling a hydrogen concentration of a fuel cell.

More specifically, the present disclosure relates to a throttle valve device in which a coil spring that biases and holds a valve at a position where a passage is slightly opened by the valve (hereinafter, this position is referred to as a "valve intermediate position"), rather than at a position where the passage is fully closed by the valve.

For example, when the throttle valve device is applied to the electronic throttle device, the throttle valve device enables an automobile to run in a limp mode in case some troubles occur in an engine control unit that controls an operating state of an engine or in the electronic throttle device. More specifically, when a motor of the electronic throttle device cannot generate a driving force, a throttle valve is configured to stop at the valve intermediate position rather than at a position where an intake passage is fully closed.

In an electronic throttle device according to a comparative example, a coil spring is used, and guides are arranged at opposite ends of the coil spring. A first spring end and a second spring end of the coil spring are engaged with a driving portion of a valve gear. Accordingly, a valve gear subassembly in which the valve gear and the coil spring are joined with each other is assembled.

In the electronic throttle device of the comparative example, the valve gear and the coil spring are joined only by the engagements between the first spring end and the driving portion of the valve gear and between the second spring end of the coil spring and the driving portion. Thus, the guides are not held at the time of the assembling. Therefore, the guides are easily detached from the coil spring at the time of the assembling. In addition, the coil spring is joined to the valve gear by a spring force of the coil spring in the valve gear subassembly. The guides and the coil spring need to be twisted by a required angle at the time of the assembling, and thus there is a difficulty in the assembling.

In contrast to the comparative example, according to the present disclosure, a coil spring and a guide of a throttle valve device can be attached easily. Further, in a method of manufacturing a throttle valve device, an angle of a coil spring can be easily adjusted at a time of assembling without a guide falling off.

A throttle valve device according to a first aspect of the present disclosure includes: a body having a passage and a motor space; a valve arranged in the passage of the body and configured to rotate together with a shaft to open and close the passage; and a motor held in the motor space of the body and configured to operate according to an electric signal and rotate the shaft via rotation of a valve gear such that the shaft is located at a valve fully-closed position at which the valve is fully closed, a valve fully-open position at which the valve is fully open, or a valve intermediate position which is between the valve fully-closed position and the valve fully-open position. The throttle valve device according to the first aspect of the present disclosure further includes: a coil spring arranged around an outer circumference of the shaft in the body and located between the valve gear and the valve, the coil spring having a first spring end extending outward in a radial direction of the coil spring at an end of the coil spring, and a second spring end extending outward in the radial direction at another end of the coil spring, the coil spring being configured to generate a spring force as an opposing force at a time of transmission of rotation from the motor to the shaft; a first guide having a first through hole through which the shaft extends at a central position of the first guide, a first end surface of the coil spring facing the first guide, the first guide being configured to rotate around the shaft together with the first spring end; and a second guide having a second through hole through which the shaft extends at a central position of the second guide, a second end surface of the coil spring facing the second guide, the second guide being configured to rotate around the shaft together with the second spring end.

The throttle valve device according to the first aspect of the present disclosure further includes: a driving portion configured to be rotated together with the valve gear, the driving portion being in contact with the first spring end and the second spring end at the valve intermediate position of the shaft, the driving portion pushing the first spring end or the second spring end against the opposing force of the coil spring during a first movement of the shaft or a second movement of the shaft, the first movement being movement of the shaft from the valve intermediate position to the valve fully-closed position, the second movement being movement of the shaft from the valve intermediate position to the valve fully-open position; and a holding portion provided in the body, the holding portion being in contact with the first spring end and the second spring end at the valve intermediate position of the shaft, the holding portion holding the first spring end or the second spring end during the first movement or the second movement of the shaft. In the present disclosure, the state where the driving portion or the holding portion are in contact with the first spring end and the second spring end includes not only a state where the driving portion or the holding portion are in direct contact with the first spring end and the second spring end but also a state where the driving portion or the holding portion are in contact with the first spring end and the second spring end through a first guide or a second guide.

In the throttle valve device according to the first aspect of the present disclosure, the first guide includes a first insertion hole, and the second guide includes a second insertion hole. An axis of the first insertion hole in an axial direction of the shaft and an axis of the second insertion hole in the axial direction are located at the same position when both the first spring end and the second spring end are positioned near the valve intermediate position of the shaft and are not in contact with the holding portion.

In the throttle valve device according to the first aspect of the present disclosure, the jig pin is inserted into the first insertion hole and the second insertion hole. Thus, the first guide, the coil spring and the second guide form a subassembly. At the stage of forming of the subassembly, both the first spring end and the second spring end can be arranged without contacting the holding portion. As a result, the subassembly including the first guide, the coil spring and the second guide can be surely attached to the body.

A second aspect of the present disclosure is a method for manufacturing the throttle valve device according to the first aspect of the present disclosure. In the manufacturing method according to the second aspect of the present disclosure, a first jig and a second jig are used. The first jig includes a first holding shaft that can be inserted into the first through hole of the first guide and the second through hole of the second guide, a jig pin that can be inserted into the first insertion hole of the first guide and the second insertion hole of the second guide, and a first base portion that houses the first holding shaft to be movable in the axial direction and fixes the jig pin. The second jig includes a second holding shaft that can be inserted into the second through hole of the second guide, and a second base portion that houses the second holding shaft to be movable in the axial direction.

The manufacturing method according to the second aspect of the present disclosure includes supporting the second guide with the second jig by inserting the second holding shaft into the second through hole. The manufacturing method includes supporting the first guide, the coil spring and the second guide with the first jig and the second jig without a load on the coil spring. The supporting without the load includes placing the coil spring between the second guide and the first guide, inserting the first holding shaft into the first through hole, and inserting the jig pin into the first insertion hole. The manufacturing method includes supporting the first guide, the coil spring and the second guide with the first jig under a load on the coil spring. The supporting under the load includes rotating the first jig around the first holding shaft to cause the jig pin to face the second insertion hole, and compressing the coil spring to insert the jig pin into the second insertion hole and insert the first holding shaft into the second through hole.

The manufacturing method according to the second aspect of the present disclosure includes removing the second jig from the first guide, the coil spring and the second guide in a state where the first jig supports the first guide, the coil spring and the second guide, attaching the first guide, the coil spring and the second guide to the body by the first jig such that the first spring end and the second spring end face the holding portion without contacting the holding portion, and removing the first jig from the first guide, the coil spring and the second guide such that the first spring end and the second spring end come into contact with the holding portion by the spring force of the coil spring.

In the manufacturing method according to the second aspect of the present disclosure, the jig pin is inserted into the first insertion hole and the second insertion hole. Further, the first holding shaft is inserted into the first through hole and the second through hole. Therefore, the first guide, the coil spring and the second guide can be supported by the first jig. Moreover, in the manufacturing method according to the second aspect of the present disclosure, the first spring end and the second spring end are not in contact with the holding portion at the attaching to the body. Then, the first spring end and the second spring end can come into contact with the holding portion by the spring force of the coil spring at the removing of the first jig. As a result, the attaching of the first guide, the coil spring and the second guide to the body can be achieved accurately and smoothly.

According to a third aspect of the present disclosure, at least one of the first insertion hole of the first guide or the second insertion hole of the second guide is an elongated hole extending in a circumferential direction centered on the shaft. The elongated hole improves ease of insertion of the jig pin.

According to a fourth aspect of the present disclosure, the first guide includes a first spring hole through which the first spring end of the coil spring extends, and the second guide includes a second spring hole through which the second spring end of the coil spring extends.

In the throttle valve device, the first spring hole and second spring hole stabilize the engagement between the coil spring and the first guide and the engagement between the coil spring and the second guide. In the manufacturing method of the throttle valve device, the supporting without the load on the coil spring includes inserting the first spring end into the first spring hole, and inserting the second spring end into the second spring hole. Therefore, the first guide and the second guide can be prevented from being detached from the subassembly including the first guide, the coil spring and the second guide.

According to a fifth aspect of the present disclosure, an end of the shaft facing the valve gear has an engaging portion. In the throttle valve device, the engaging portion engages with the valve gear such that the shaft is rotatable together with the valve gear. As a result, the rotation of the valve gear can be accurately transmitted to the shaft. In the manufacturing method of the throttle valve device, the second holding shaft includes a second holding-shaft engaging portion that is the same in shape as the engaging portion, and the supporting without the load on the coil spring includes arranging the second holding-shaft engaging portion to be engaged with the first holding shaft of the first jig such that the second holding shaft is coaxial with the first holding shaft. This improves ease of assembling the throttle valve device.

An embodiment will be described below with reference to the drawings, in which a throttle valve device of the present disclosure is applied to an electronic throttle device 1. As described above, the throttle valve device of the present disclosure can be widely used as a throttle valve device such as an EGR valve, a pressure control valve for an intake passage of a diesel engine, and a negative pressure control valve for a fuel cell. Therefore, terms such as a "throttle shaft" and a "throttle valve" described below are just examples in use of the present disclosure in the electronic throttle device 1, but the uses of the shaft and the valve are not limited to the throttle.

FIG. 1 is a vertical cross-sectional view of the electronic throttle device 1. An overview of the electronic throttle device 1 will be described with reference to FIG. 1. The electronic throttle device 1 is arranged in an engine compartment and controls a flow rate of an intake air taken into an engine. An engine control unit (not shown) calculates an optimum intake amount in accordance with, for example, a driver's accelerator pedal operation and an engine rotation state, and outputs a rotation rate to a motor 100 according to the calculation results.

Figure 2:
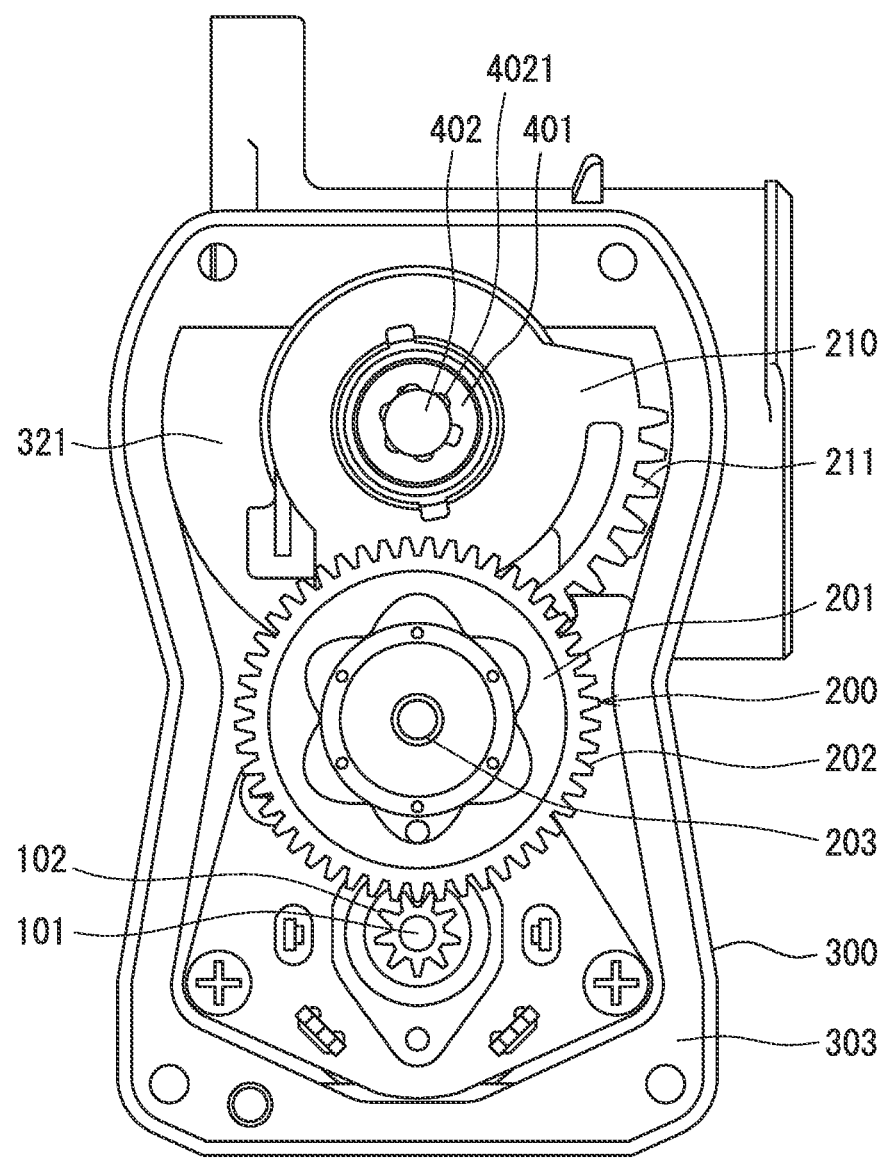
FIG. 2 is a front view of a body.

The motor 100 is arranged in a motor space 330 of a body 300 made of aluminum or an aluminum alloy. Rotation of the motor 100 is transmitted to a speed reduction mechanism 200 via a motor pinion 102 press-fitted and fixed to a motor shaft 101 (shown in FIG. 2). As shown in FIG. 2, the speed reduction mechanism 200 includes the motor pinion 102, an intermediate gear 201, and a valve gear 210.

A large-diameter gear 202 of the intermediate gear 201 meshes with the motor pinion 102. The intermediate gear 201 is held to be rotatable about an intermediate shaft 203. The intermediate shaft 203 is press-fitted and fixed into a fitting hole 301 of the body 300. A small-diameter gear 204 of the intermediate gear 201 meshes with a teeth portion 211 that is formed in an arc shape on an outer circumferential surface of the valve gear 210. Rotation of the motor pinion 102 is transmitted to the valve gear 210 via the intermediate gear 201. Therefore, rotation of the motor shaft 101 is decelerated by the intermediate gear 201 and the valve gear 210 and then transmitted to a throttle shaft 402.

A first magnet 220 and a second magnet 221 having semicircular arc shapes are arranged in an inner circumference of a cup center portion 212 of the valve gear 210, and the first magnet 220 and the second magnet 221 form a magnetic circuit. A lever 401 having a circular-plate shape is disposed in a deep portion (the lower side in FIG. 1) of the cup center portion 212 of the valve gear 210. The first magnet 220, the second magnet 221 and the lever 401 are insert-molded with the valve gear 210.

An end surface of the throttle shaft 402 has an engaging portion 4021, and the lever 401 has a surface that engages with the engaging portion 4021. The lever 401 is swaged on the end surface of throttle shaft 402 while being engaged with engaging portion 4021 of throttle shaft 402. Therefore, the valve gear 210 is connected to the throttle shaft 402 via the lever 401, and rotation of the valve gear 210 is transmitted to the throttle shaft 402. A throttle valve 400 having a circular-plate shape is fixed to the throttle shaft 402 by a screw 403. The throttle valve 400 increases or decreases an opening area of an intake passage 320 formed in the body 300 according to rotation of the throttle valve 400.

An open end 303 of the body 300 (the upper side in FIG. 1, the front side in FIG. 2) is covered by a cover 500. The cover 500 has a substantially rectangular shape corresponding to the shape of body 300. The cover 500 is formed of a resin such as polybutylene terephthalate (PBT), and ribs are provided at predetermined locations to increase its strength.

A pair of rotation angle sensors 510, which are Hall ICs, are disposed in the cover 500 at positions corresponding to an axis 407 of the throttle shaft 402. The rotation angle sensors 510 are fixed to the cover 500. The first magnet 220 and the second magnet 221 which are a pair of arc-shaped magnets and have been insert-molded with the valve gear 210 are arranged on an outer periphery of the rotation angle sensors 510. Since the first magnet 220 and the second magnet 221 rotate around the axis 407 according to the rotation of the throttle shaft 402, the magnetic circuit changes in position according to a rotation angle of the throttle valve 400. The rotation angle sensors 510 detect a change in magnetic force caused by the positional change of the magnetic circuit, thereby detecting an opening degree of the throttle valve 400. Then, the detected position information is fed back to an engine control unit (not shown).

The throttle shaft 402 is rotatably supported in the body 300 by a first bearing 405 and a second bearing 406. The first bearing 405 and the second bearing 406 are located opposite sides of the throttle valve 400 and face each other across the throttle valve 400. The first bearing 405 is a plain bearing, and the second bearing 406 is a ball bearing. An opening 302 of the body 300 is an opening through which the first bearing 405 is inserted, and the opening 302 is covered by a plug 310.

Figure 3:
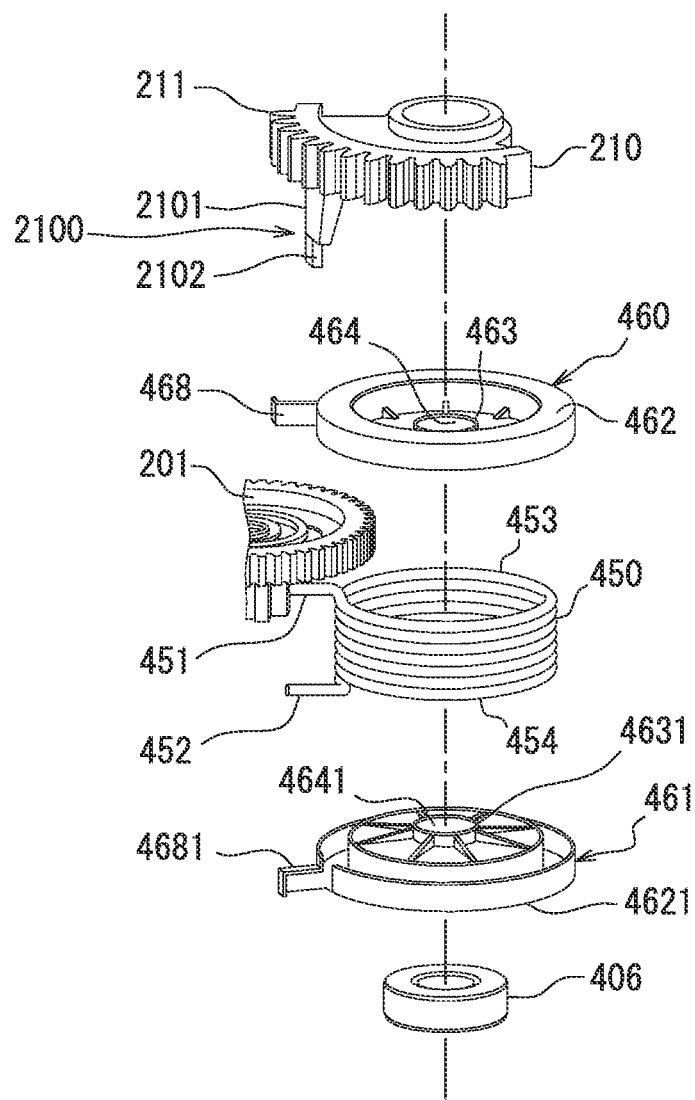
FIG. 3 is an exploded perspective view showing a valve gear, a coil spring, a first guide, a second guide, and a bearing.

The body 300 has a space 321 for housing the valve gear 210, and a coil spring 450 for urging the throttle shaft 402 by a spring force is arranged in this space 321. The coil spring 450 is made of spring steel and has a cylindrical shape with a diameter of about 15 mm as shown in FIG. 3. The throttle shaft 402 is arranged radially inward of the coil spring 450 having a cylindrical shape. In other words, the coil spring 450 is rotatably arranged radially outward of the throttle shaft 402. One end of the coil spring 450 is a first spring end 451, and the other end of the coil spring 450 is a second spring end 452. The first spring end 451 and the second spring end 452 are bent outward in a radial direction and protrude outward by about 5 mm.

A first end surface 453 that is one end surface of the coil spring 450 is covered by a first guide 460. A second end surface 454 that is another end surface of the coil spring 450 is covered by a second guide 461. Both the first guide 460 and the second guide 461 are made of nylon 66 resin. Although the first guide 460 is described below, the description of the first guide 460 also applies to the second guide 461.

Figure 8:
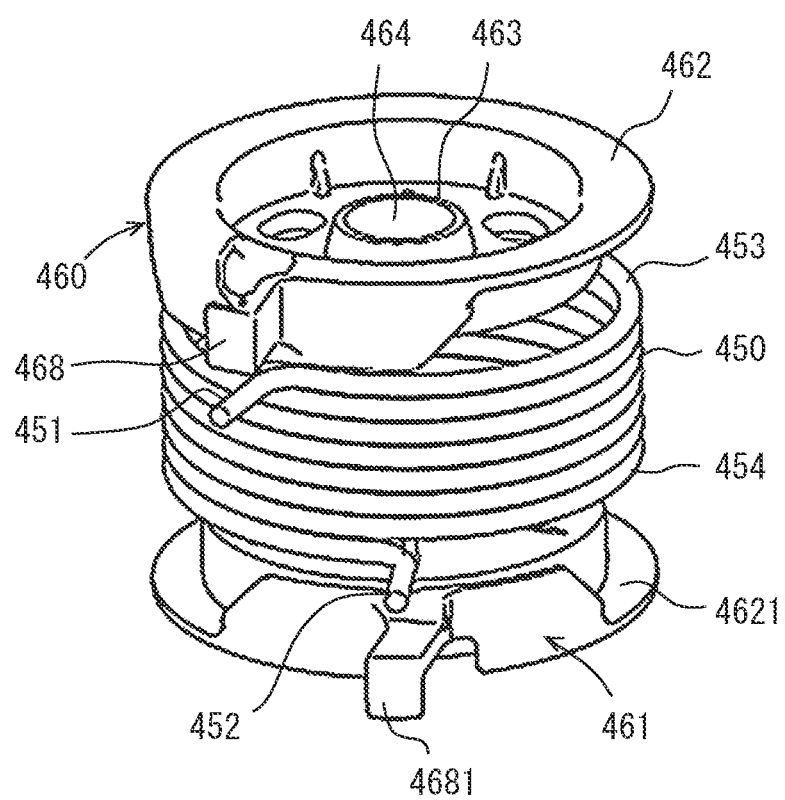
FIG. 8 is a perspective view showing a subassembly including the first guide, the coil spring and the second guide.
Figure 9:
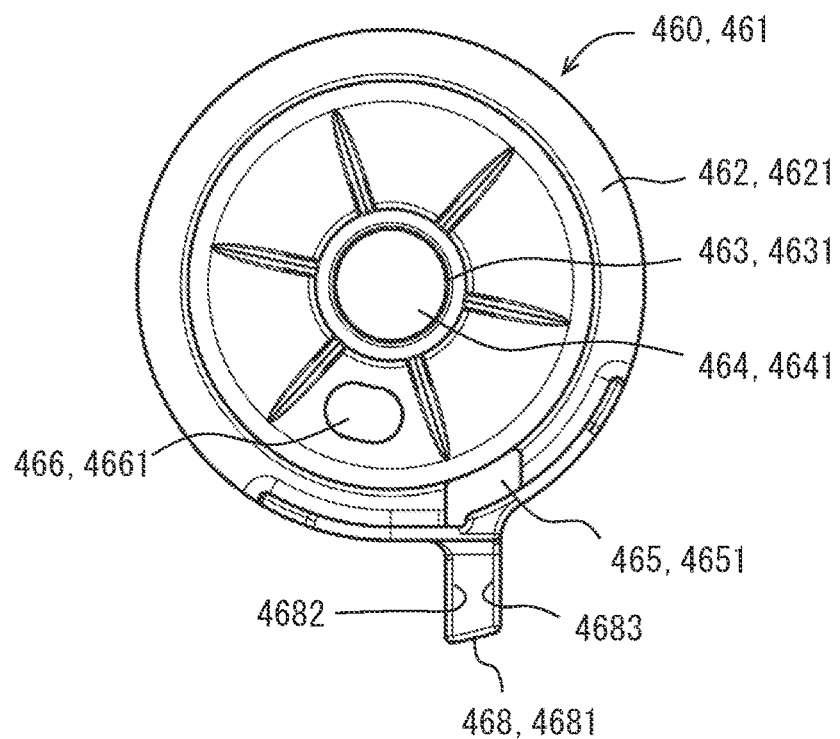
FIG. 9 is a front view showing the first guide and the second guide.
Figure 10:
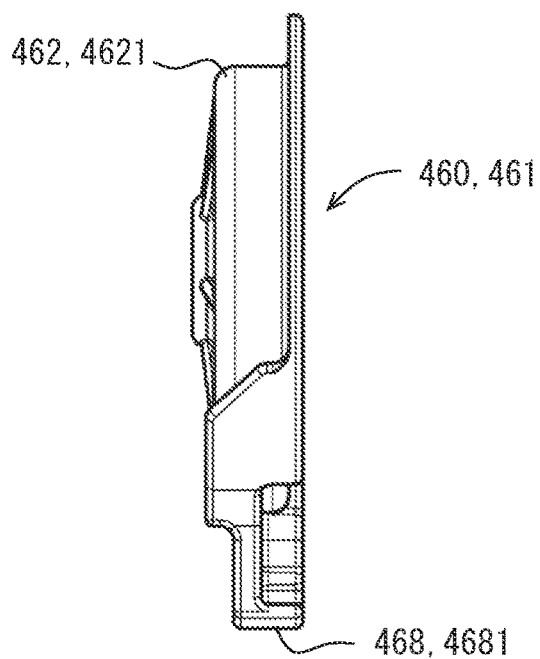
FIG. 10 is a side view showing the first guide and second guide shown in FIG. 9.

As shown in FIGS. 8, 9 and 10, the first guide 460 includes a first annular portion 462 that covers the first end surface 453 of the cylindrical coil spring 450. Then, the first end surface 453 of the coil spring 450 is housed in the first annular portion 462. The first guide 460 has a hub 463 formed at the center of the first annular portion 462, and a first through hole 464 is formed at the center of the hub 463. The throttle shaft 402 is loosely fitted into the first through hole 464. Thus, the first guide 460 is disposed rotatably around the throttle shaft 402.

The first guide 460 has a first guide hook 468 that protrudes in the radial direction outward from the first annular portion 462. As shown in FIGS. 8 and 9, the first guide hook 468 includes a stopper surface 4682 that contacts the first spring end 451 to receive the spring force of the coil spring 450, and a protector 4683 that is provided opposite the stopper surface 4682 and covers a lateral surface of the first spring end 451. The first guide hook 468 includes a first spring hole 465 through which the first spring end 451 extends. The first spring hole 465 is open at a proximal end of the first guide hook 468 of the first annular portion 462. The first spring hole 465 improves ease of attachment of the coil spring 450, and the protector 4683 prevents the coil spring 450 from falling off. Thus, the spring force of the first spring end 451 is surely transmitted to the stopper surface 4682 by the first spring hole 465 and the protector 4683.

Figure 4:
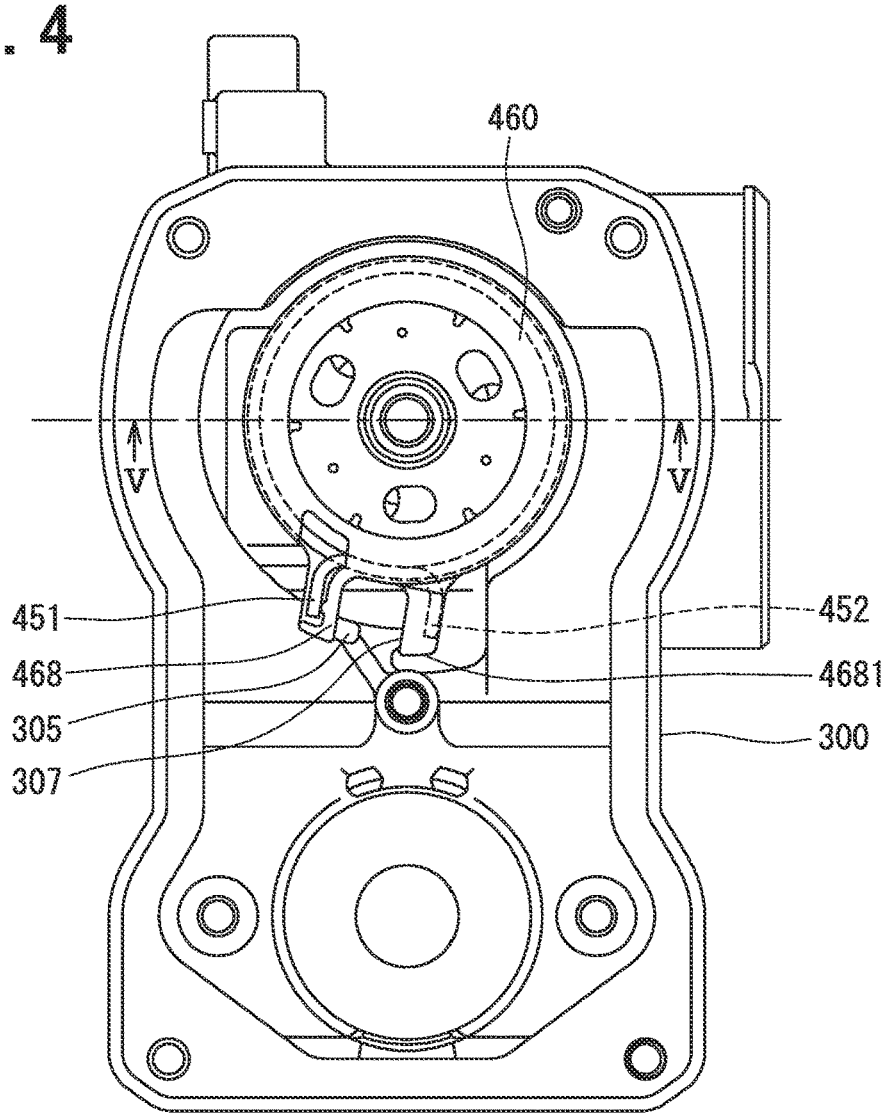
FIG. 4 is a front view of the body in which an intermediate gear and the valve gear are omitted from FIG. 2.

The first annular portion 462 of the first guide 460 also has a first insertion hole 466 into which a jig pin can be inserted. The first insertion hole 466 has an elongated hole shape extending in the circumferential direction around a central axis of the first through hole 464. Although FIGS. 4 and 8 show multiple holes, and FIG. 9 shows a single hole, the first insertion hole 466 is a single hole facing a second insertion hole 4661 of the second guide 461 in a predetermined positional relationship.

Although the first guide 460 has been described above, the second guide 461 has the same shape as the first guide 460 as described above. Therefore, the description regarding the first guide 460 can also be applied to the second guide 461. Therefore, reference numerals of components of the second guide 461 are also shown in FIGS. 9 and 10. The second guide 461 also includes a second annular portion 4621, a hub 4631 formed at the center of the second annular portion 4621, and a second through hole 4641 that is open at the center of the hub 4631. Similarly, a second guide hook 4681 extends in a radial direction outward from an outer periphery of the second annular portion 4621. A second spring hole 4651 and the second insertion hole 4661 are open in the second annular portion 4621. Although the first guide 460 and the second guide 461 have been described with reference to FIGS. 8 to 10, the first guide 460 and the second guide 461 in FIG. 1 also have the same shape.

Since the first guide 460 and the second guide 461 have the same shape, it is not necessary to classify the first guide 460 and the second guide 461 at the time of assembling, and as a result, assembling time can be reduced. In addition, the same shape can reduce a cost of an assembling equipment and a cost of the components.

However, the second guide 461 is placed to be reversed with respect to the first guide 460. Therefore, as shown in FIG. 3, the first annular portion 462 of the first guide 460 houses and holds the first end surface 453 of the coil spring 450, while the second annular portion 4621 of the second guide 461 houses and holds the second end surface 454 of the coil spring 450.

As shown in FIG. 1, the first guide 460, the coil spring 450, and the second guide 461 are arranged around the throttle shaft 402 on a back surface (the lower side in FIG. 1) of the valve gear 210. Then, the hub 463 of the first guide 460 is brought into contact with the metal lever 401, and the hub 4631 of the second guide 461 is brought into contact with an inner race of the ball bearing (i.e., second bearing 406).

FIG. 11 briefly shows a behavior of the coil spring 450, and the body 300 has a holding portion 3050 that receives the spring force of the coil spring 450. An urging force of the coil spring 450 holds the throttle valve 400 at a valve intermediate position in the intake passage 320. Although this valve intermediate position corresponds to a closed position, the throttle valve 400 does not fully close the intake passage 320 so as to allow the vehicle to run in a limp mode in case of malfunction. That is, the intake passage 320 is slightly open so that a predetermined amount of intake air can flow therethrough. FIG. 11 shows that the first spring end 451 and the second spring end 452 of the coil spring 450 are in direct contact with the holding portion 3050 for the sake of simplification. However, in reality, the first guide hook 468 of the first guide 460 and the second guide hook 4681 of the second guide 461 are in contact with the holding portion 3050.

The spring force of the coil spring 450 is also applied to a driving portion 2100 that is integrally formed with the valve gear 210. Similar to the above, the driving portion 2100 is actually arranged between the first guide hook 468 of the first guide 460 and the second guide hook 4681 of the second guide 461. In FIG. 11, the quarter circles indicate the movement areas of the driving portion 2100. The driving portion 2100 rotates clockwise from the valve intermediate position to a valve fully-closed position, and rotates counterclockwise from the valve intermediate position to a valve fully-open position. During this rotation, the driving portion 2100 engages with either one of the first guide hook 468 of the first guide 460 or the second guide hook 4681 of the second guide 461 such that the driving portion 2100 pushes the first spring end 451 or the second spring end 452 of the coil spring 450. At this time, the other of the first guide hook 468 of the first guide 460 or the second guide hook 4681 of the second guide 461 is engaged with the holding portion 3050 such that the first spring end 451 or the second spring end 451 of the coil spring 450 is held at its position.

Although FIG. 11 shows the brief behavior of the coil spring 450, next, the opening and closing of the throttle valve 400 will be described together with the behavior of the coil spring 450. In the present disclosure, the holding portion 3050 consists of a first body hook 305 and a second body hook 307. Both the first body hook 305 and the second body hook 307 are integrally formed on an outer surface of the body 300. When the throttle valve 400 opens the intake passage 320 in order to increase a speed of the engine, the second spring end 452 of the coil spring 450 contacts the second body hook 307 and stays at its position. Then, the first spring end 451 moves according to rotation of the throttle shaft 402. In response to this movement, the coil spring 450 applies a returning force to the throttle shaft 402, the valve gear 210, and eventually the motor 100.

On the other hand, when the throttle valve 400 closes the intake passage 320 to have the engine in an idling state, the throttle shaft 402 rotates from the valve intermediate position to the valve fully-closed position. In this case, in contrast to the fully opening movement described above, the first spring end 451 of the coil spring 450 contacts the first body hook 305 and is kept at its position, and the second spring end 452 moves in accordance with the rotation of the throttle shaft 402.

Theses movements will be described with reference to FIGS. 4 to 7. FIG. 4 is a front view in which the intermediate gear 201 and the valve gear 210 are omitted from FIG. 2, and shows the throttle valve 400 at the valve intermediate position. The first guide hook 468 of the first guide 460 is in contact with a first body hook 305 formed on the body 300. At the same time, the second guide hook 4681 of the second guide 461 is in contact with a second body hook 307 formed on the body 300.

Figure 5:
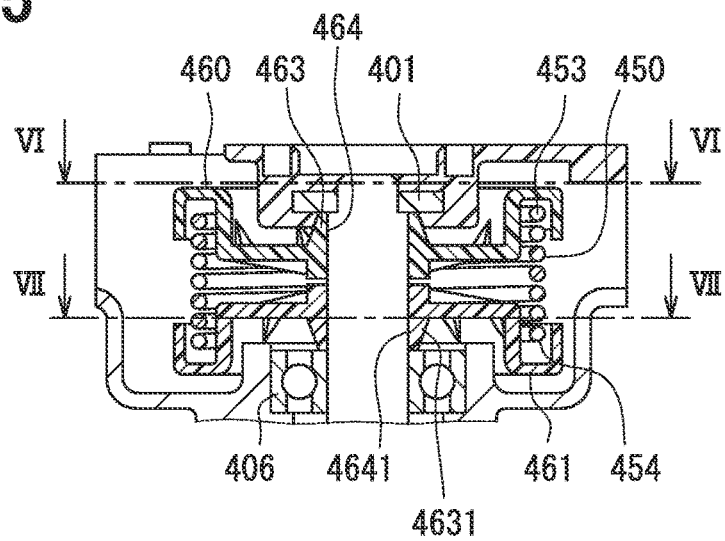
FIG. 5 is a cross-sectional view taken along a line V-V in FIG. 4.
Figure 6:
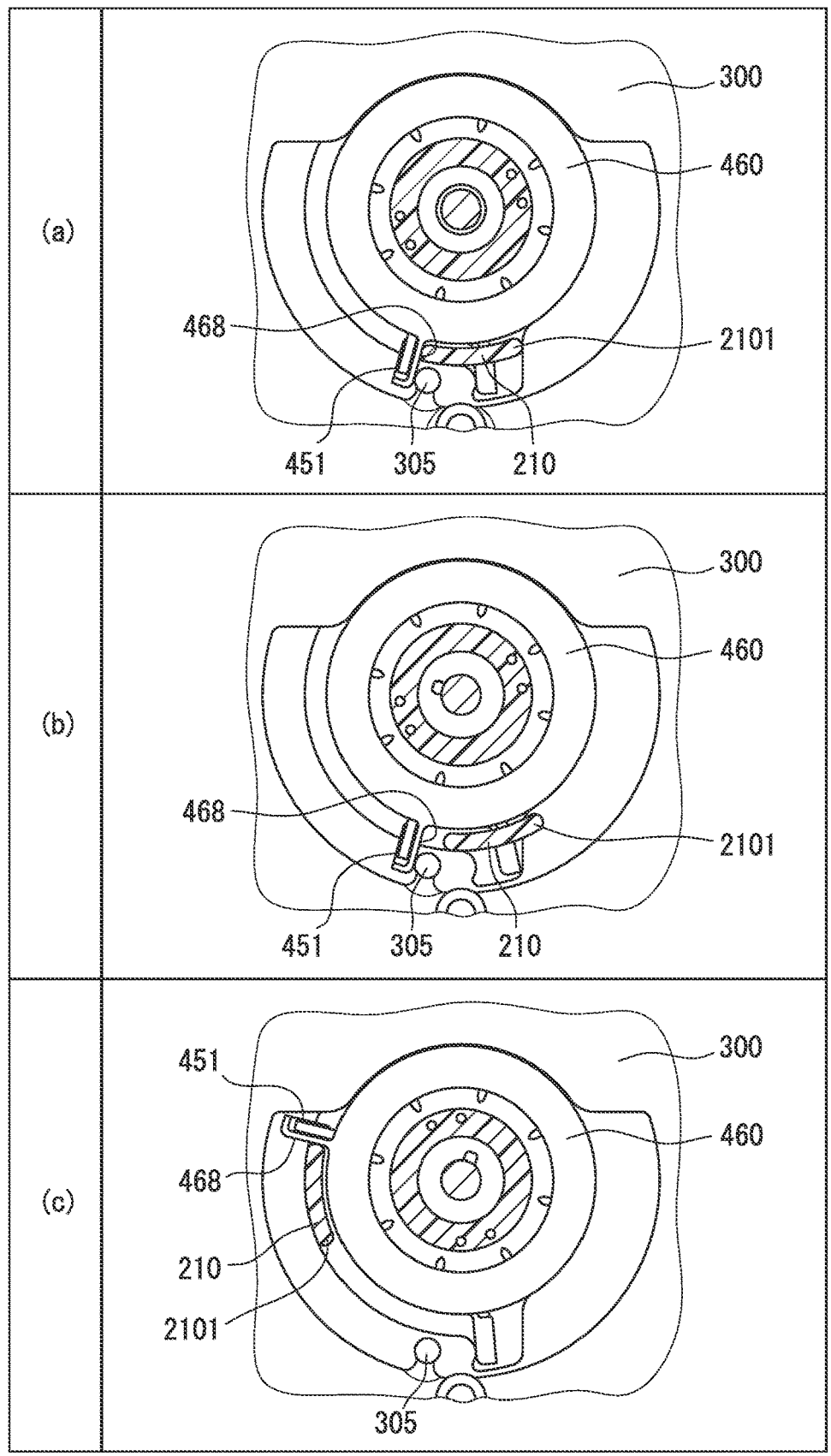
FIG. 6 is a cross-sectional view taken along a line VI-VI in FIG. 5.
Figure 7:
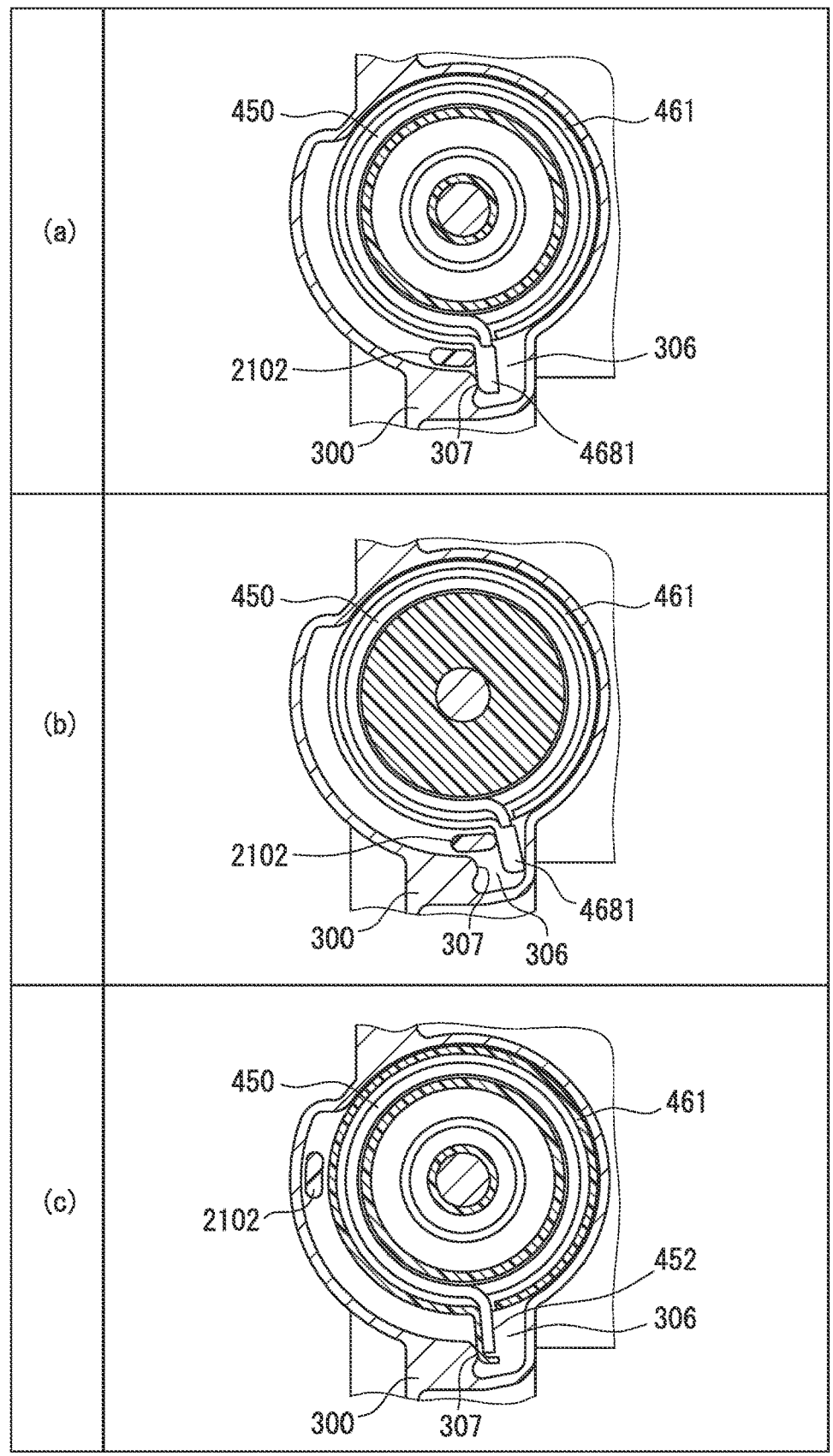
FIG. 7 is a cross-sectional view taken along a line VII-VII in FIG. 5.

FIG. 5 is a cross-sectional view taken along the line V-V of FIG. 4, and as shown in the figure, the first guide 460 and the second guide 461 are interposed and held between and by the lever 401 and the second bearing 406. FIGS. 6 and 7 are cross-sectional views taken along the VI-VI line and the VII-VII line of FIG. 5, respectively. FIGS. 6(a) and 7(a) show the valve intermediate position, FIGS. 6(b) and 7(b) show the valve fully-closed position, and FIGS. 6(c) and 7(c) show the valve fully-open position. As shown in FIG. 3, the driving portion 2100 of the valve gear 210 has a first valve gear hook 2101 on an end of the driving portion 2100 facing the teeth portion 211. The first valve gear hook 2101 can be in contact with the first guide hook 468 of the first guide 460. The driving portion 2100 has a second valve gear hook 2102 on an end of the driving portion 2100 facing away from the teeth portion 211. The second valve gear hook 2102 can be in contact with the second guide hook 4681 of the second guide 461.

As shown in FIG. 6, at a valve position between the valve intermediate position (position (a)) and the fully closed position (position (b)), the first guide hook 468 holding the first spring end 451 remains in contact with the first body hook 305 of the body 300. The first valve gear hook 2101 of the valve gear 210 is simply separated from the first guide hook 468. In contrast, at a valve position between the valve intermediate position (position (a)) and the fully open position (position (c)), the first guide hook 468 is moved clockwise by the first valve gear hook 2101 of the valve gear 210.

Next, the movement of the second guide hook 4681 is shown in FIG. 7. At a valve position between the valve intermediate position (position (a)) and the fully closed position (position (b)), the second guide hook 4681 holding the second spring end 452 moves counterclockwise in a movement groove 306 of the body 300 according to a rotation of the second valve gear hook 2102 of the valve gear 210. In contrast, at a valve position between the valve intermediate position (position (a)) and the fully open position (position (c)), the second guide hook 4681 does not move and remains in contact with the second body hook 307 which is one end of the movement groove 306 of the body 300.

As described above, at the valve intermediate position, it is premised that the first guide hook 468 and the second guide hook 4681 are both in contact with the holding portion 3050 and the driving portion 2100. Based on this premise, the rotation of the valve gear 210 from the valve intermediate position due to the rotation of the motor 100 can cause the throttle valve 400 to open and close the intake passage 320 without delay. In the explanation of the mechanism shown in FIG. 11, the movement from the valve intermediate position to the valve fully-open position is in the counterclockwise direction, but this direction can be reversed depending on the mechanism. For example, in the throttle valve 400 described in FIGS. 1 to 7, movement from the valve intermediate position to the valve fully-open position is clockwise, and movement from the valve intermediate position to the valve fully-closed position is counterclockwise.

Next, a method of manufacturing the electronic throttle device 1 having the above configuration will be described.

Figure 12A:
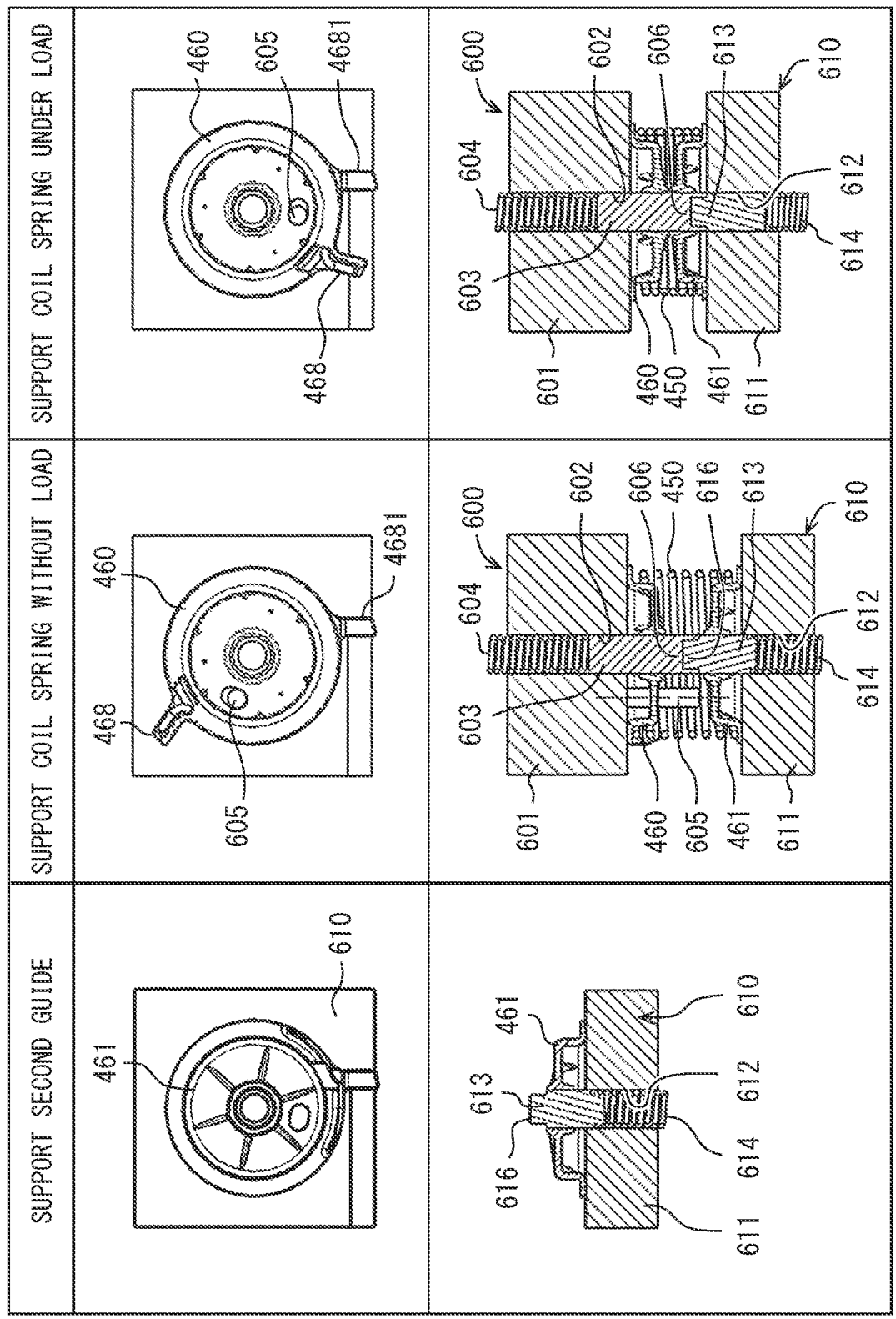
FIG. 12A is a diagram for explaining a method of manufacturing a throttle valve device.
Figure 12B:
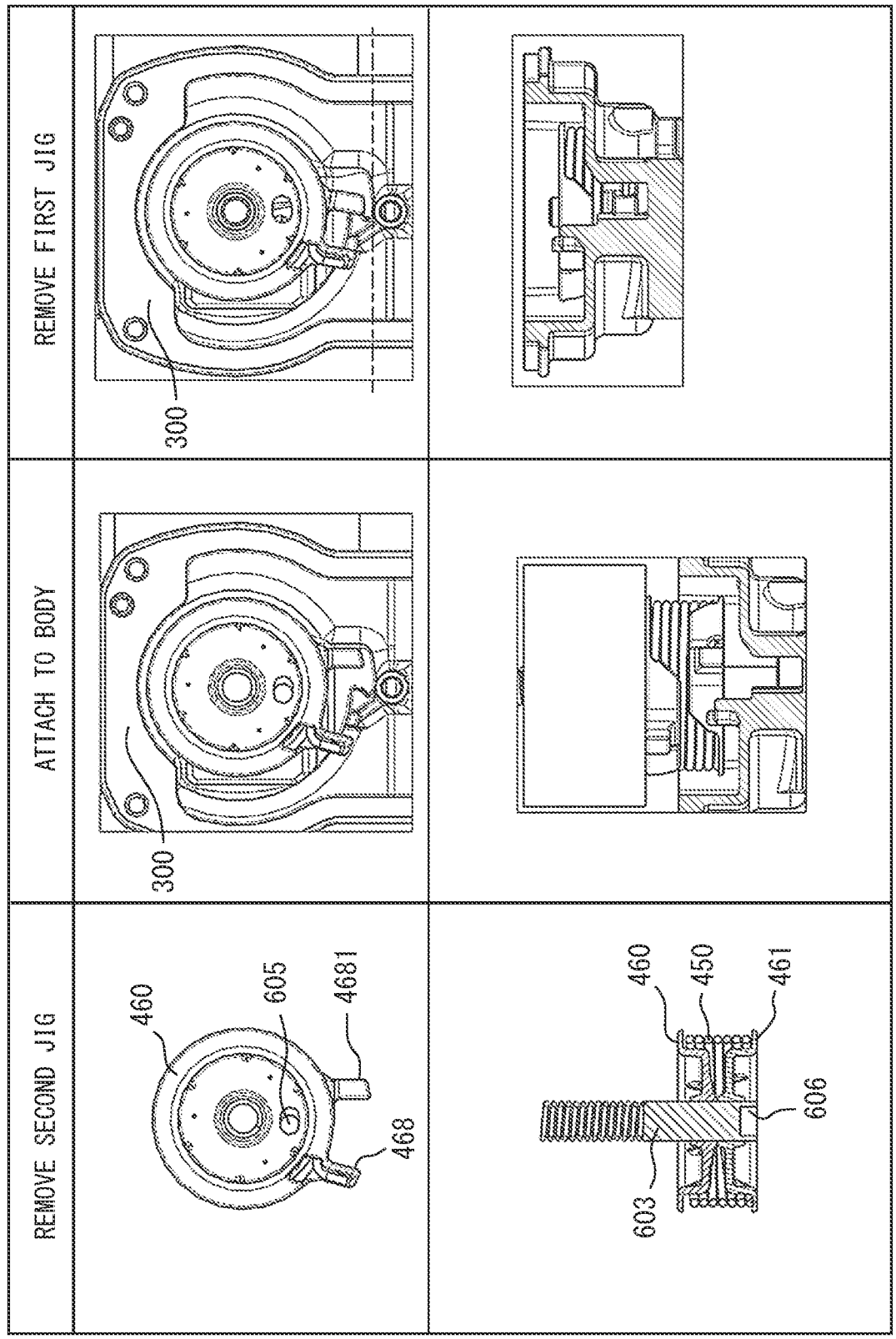
FIG. 12B is a diagram for explaining a method of manufacturing the throttle valve device.

Hereinafter, assembling of the first guide 460, the coil spring 450 and the second guide 461 will be mainly described. In this assembling, as shown in FIGS. 12A and 12B, a first jig 600 and a second jig 610 are used. The upper sections of FIGS. 12A and 12B show arrangements of the first guide 460 and the second guide 461, and the lower sections of FIGS. 12A and 12B show cross sections of an assembly along the central axes of the first through hole 464 and the second through hole 4641. The first jig 600 has a first housing hole 602 formed in a first base portion 601 of the first jig 600. A first holding shaft 603 is slidably arranged in the first housing hole 602. The first holding shaft 603 is urged by a first jig spring 604 such that the first holding shaft 603 is pushed outward.

The first holding shaft 603 can be inserted into the first through hole 464 of the first guide 460 and the second through hole 4641 of the second guide 461 in a state where the first guide 460 and the second guide 461 are set on the first base portion 601. A jig pin 605 is also fixed to the first base portion 601. The jig pin 605 can be inserted into the first insertion hole 466 of the first guide 460 and the second insertion hole 4661 of the second guide 461 in a state where the first guide 460 and the second guide 461 are set on the first base portion 601.

The second jig 610 has a second housing hole 612 formed in a second base portion 611 of the second jig 610. A second holding shaft 613 is slidably arranged in the second housing hole 612. The second holding shaft 613 is urged by a second jig spring 614 such that the second holding shaft 613 is pushed outward. The second holding shaft 613 can be inserted into the second through hole 4641 of the second guide 461 in a state where the second guide 461 is set on the second base portion 611. An end of the second holding shaft 613 has a second holding-shaft engaging portion 616 that has the same shape as the engaging portion 4021 of the throttle shaft 402. An end of the first holding shaft 603 has a first holding-shaft engaging portion 606 that can be engaged with the second holding-shaft engaging portion 616.

First, the second holding shaft 613 is inserted into the second through hole 4641 of the second guide 461 using the second jig 610. This step is a second guide supporting step of supporting the second guide 461 by the second jig 610.

Next, using the first jig 600 and the second jig 610, the first guide 460, the coil spring 450 and the second guide 461 are held and sandwiched by and between the first jig 600 and the second jig 610. Then, the first holding shaft 603 of the first jig 600 is inserted into the first through hole 464 of the first guide 460. Also, the jig pin 605 is inserted into the first insertion hole 466 of the first guide 460. In this state, the end of the first holding shaft 603 of the first jig 600 is engaged with the second holding shaft 613 of the second jig 610. That is, the first holding-shaft engaging portion 606 and the second holding-shaft engaging portion 616 are engaged with each other such that the first holding shaft 603 and the second holding shaft 613 are arranged coaxially. The engagement between the first holding-shaft engaging portion 606 and the second holding-shaft engaging portion 616 allows the first guide 460 and the second guide 461 to be coaxially arranged.

Since a preload is not applied on the coil spring 450 in this state, the first guide 460 and the second guide 461 are largely separated from each other by the coil spring 450. Even in this state, the first annular portion 462 of the first guide 460 accommodates the first end surface 453 of the coil spring 450, and the first guide hook 468 holds the first spring end 451. The second annular portion 4621 of the second guide 461 accommodates the second end surface 454 of the coil spring 450, and the second guide hook 4681 holds the second spring end 452. This step is a coil-spring no-load supporting step because the coil spring 450 is not preloaded.

From this state, the first jig 600 is rotated around the first holding shaft 603 so that the jig pin 605 faces the second insertion hole 4661 of the second guide 461. Therefore, both the first insertion hole 466 of the first guide 460 and the second insertion hole 4661 of the second guide 461 in the present disclosure are holes open at positions where the jig pin 605 can be inserted into the holes. Next, the first jig 600 is moved toward the second jig 610. Along with this movement, the first holding shaft 603 is inserted into the second through hole 4641 of the second guide 461, and the jig pin 605 is inserted into the second insertion hole 4661 of the second guide 461. Even in this state, since the first holding-shaft engaging portion 606 and the second holding-shaft engaging portion 616 are engaged with each other, the first holding shaft 603 and the second holding shaft 613 move together. An urging force of the first jig spring 604 is larger than an urging force of the second jig spring 614. Thus, the second holding shaft 613 is accommodated in the second housing hole 612 of the second jig 610. In addition, the end of the first holding shaft 603 also enters the second housing hole 612. The coil spring 450 is also compressed in an axial direction when the first jig 600 is moved. This step is a coil-spring load supporting step because a preload is applied to the coil spring 450.

Next, the second jig 610 is removed. At the coil spring loading process, the preload of the coil spring 450 is applied to the first jig 600. Therefore, even when the second jig 610 is removed, a subassembly including the first guide 460, the coil spring 450 and the second guide 461 is held by the first jig 600. This step is a second jig removing step.

The next step is a step of attaching the subassembly including the first guide 460, the coil spring 450 and the second guide 461, to the body 300. Before this step, the first bearing 405, the second bearing 406 and the intermediate shaft 203 are attached to the body 300. Although the motor 100 may be attached to the body 300 in the next step, the motor 100 may be fixed in the motor space 330 of the body 300 in advance. Using the first jig 600, the subassembly including the first guide 460, the coil spring 450 and the second guide 461 is arranged in the space 321.

At this time, the first guide hook 468 of the first guide 460 faces the first body hook 305, and the second guide hook 4681 of the second guide 461 faces the second body hook 307. However, the first guide hook 468 is not in contact with the first body hook 305 because their positions are precisely determined by the jig pin 605. Similarly, the second guide hook 4681 is not in contact with the second body hook 307. Therefore, the first guide 460 and the second guide 461 do not get caught on the body 300. Thus, both the first insertion hole 466 of the first guide 460 and the second insertion hole 4661 of the second guide 461 in the present disclosure are open at positions where the first guide 460 and the second guide 461 are not contact with the holding portion 3050 of the body 300 (i.e., the first body hook 305 and the second body hook 307). This step is a body assembling step.

Next, the throttle shaft 402 is inserted into the subassembly from the opening 302 of the body 300. Since the engaging portion 4021 formed at the end of the throttle shaft 402 has a shape to engage with the first holding-shaft engaging portion 606, engagement between the engaging portion 4021 of the throttle shaft 402 and the first holding-shaft engaging portion 606 fixes the position of the throttle shaft 402. Therefore, accurate attachment of the throttle shaft 402 can be achieved. In this state, the throttle valve 400 is inserted into a slit formed on the throttle shaft 402 and fixed to the throttle shaft 402 with the screw 403. After that, a first jig removing step of removing the first jig 600 is performed.

By removing the first jig 600, the jig pin 605 is pulled out from the first insertion hole 466 of the first guide 460 and the second insertion hole 4661 of the second guide 461. As a result, the first guide 460 and the second guide 461 are freed and is moved by the spring force of the coil spring 450. This movement causes the first guide hook 468 to contact the first body hook 305 and causes the second guide hook 4681 to contact the second body hook 307. As a result, the subassembly including the first guide 460, the coil spring 450 and the second guide 461 is assembled to the body 300.

After removing the first jig 600, the valve gear 210 is arranged in the space 321. More specifically, the driving portion 2100 is arranged between the first guide hook 468 of the first guide 460 and the second guide hook 4681 of the second guide 461. The arrangement of the valve gear 210 can be performed easily because a width of the second valve gear hook 2102 of the driving portion 2100 in a circumferential direction is narrower than an interval between the first guide hook 468 and the second guide hook 4681. Further, since the first valve gear hook 2101 of the driving portion 2100 is tapered to have a width in the circumferential direction gradually widens toward the teeth portion 211, the first valve gear hook 2101 can be fitted between the first guide hook 468 and the second guide hook 4681.

As described above, the valve gear 210 is placed in the space 321 so that the driving portion 2100 is arranged between the first guide hook 468 of the first guide 460 and the second guide hook 4681 of the second guide 461. Then, the lever 401 is swaged and fixed to the engaging portion 4021 of the throttle shaft 402. Next, the intermediate gear 201 is fitted to the intermediate shaft 203. At the same time, the large-diameter gear 202 of the intermediate gear 201 meshes with the motor pinion 102. Also, the small-diameter gear 204 of the intermediate gear 201 meshes with the teeth portion 211 that is formed in the arc shape on the outer circumferential surface of the valve gear 210.

After the assembly of the intermediate gear 201 and the valve gear 210 is completed, the cover 500 is attached to the open end 303 of the body 300 and fixed with bolts. Finally, the plug 310 closes the opening 302 of the body 300. Thus, the assembly of the electronic throttle device 1 is completed.

In the present disclosure, the subassembly including the first guide 460, the coil spring 450 and the second guide 461 can be integrally assembled using the first jig 600. Therefore, the first guide 460 and the second guide 461 can be prevented from falling off the coil spring 450 in the subassembly. In particular, since the jig pin 605 fits into the first insertion hole 466 of the first guide 460 and the second insertion hole 4661 of the second guide 461, the first guide 460 and the second guide 461 is secured exactly in position in the subassembly. Therefore, during the assembling, the first guide 460 and the second guide 461 do not contact the first body hook 305 and the second body hook 307 which form the holding portion 3050 of the body 300.

In the example of FIG. 9, a surrounding wall was formed on the entire circumference of the first annular portion 462 of the first guide 460, but the shapes of the first guide 460 and the second guide 461 are not limited to the shapes of FIG. 9. For example, a surrounding wall may be formed only in the vicinity of the first guide hook 468 of the first annular portion 462. Accordingly, the area of the surrounding wall can be reduced and its weight can be reduced. Moreover, since the surrounding wall holds the coil spring 450 in the vicinity of the first guide hook 468, the holding of the coil spring 450 can be secured.

In the above example, the first insertion hole 466 of the first guide 460 and the second insertion hole 4661 of the second guide 461 are both elongated holes extending in the circumferential direction centered on the central axis. This shape may be good for ease of inserting the jig pin 605. However, either one or both of the first insertion hole 466 and the second insertion hole 4661 can be a round hole that is slightly larger in diameter than the jig pin 605.

Figure 13:
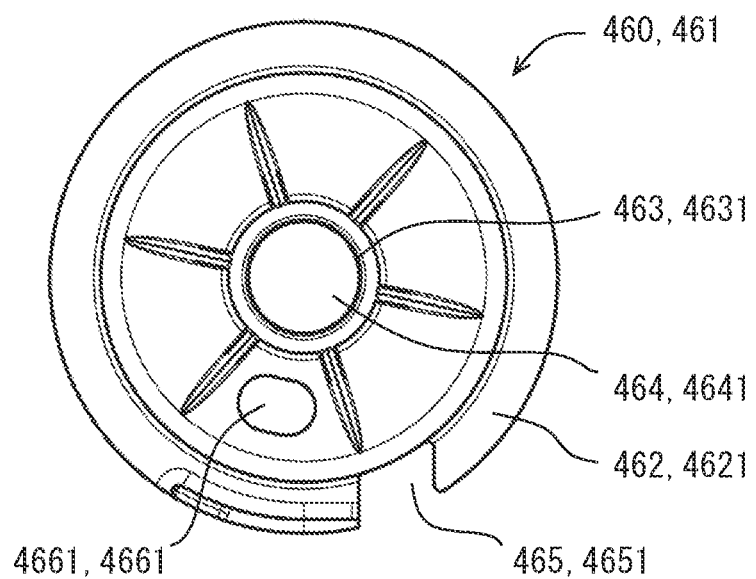
FIG. 13 is a front view showing a first guide and a second guide according to another example.
Figure 14:
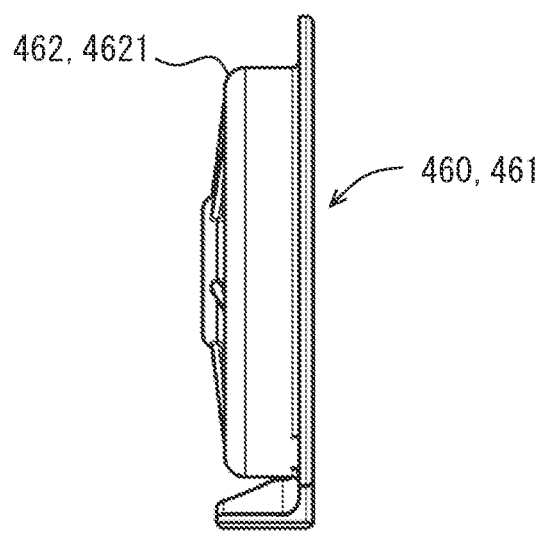
FIG. 14 is a side view showing the first guide and second guide shown in FIG. 13.

Also, the first guide hook 468 and the second guide hook 4681 can be omitted. As shown in FIGS. 13 and 14, the first spring end 451 and the second spring end 452 may extend out from the first spring hole 465 and the second spring hole 4651, respectively. In this case, the first spring end 451 and the second spring end 452 come into direct contact with the holding portion 3050 of the body 300, which is similar to the arrangement schematically shown in FIG. 11. However, in the present disclosure, the expression "the first spring end 451 and the second spring end 452 come into contact with the holding portion 3050 and the driving portion 2100" is not to limited to the direct contact shown in FIGS. 11, 13 and 14. As described above, this expression includes the contact via the first guide hook 468 and the second guide hook 4681. In FIG. 13, although the first spring hole 465 and the second spring hole 4651 are each formed in a groove shape, spaces through which the first spring end 451 and the second spring end 452 are called the first spring hole 465 and the second spring hole 4651.

In the above example, the first guide 460 has the first spring hole 465, and the second guide 461 has the second spring hole 4651. The first spring end 451 and the second spring end 452 of the coil spring 450 extend through the first spring hole 465 and the second spring hole 4651. Therefore, the first guide 460 and the second guide 461 can be prevented from falling off during the assembling. Further, the first guide 460 and the second guide 461 can be stably held in the electronic throttle device 1. However, the first spring hole 465 and the second spring hole 4651 are not essential, either one or both of them can be provided.

Further, in the above example, the engaging portion 4021 formed at the end of the throttle shaft 402 has a shape that engages with the first holding-shaft engaging portion 606. The engagement between the engaging portion 4021 of the throttle shaft 402 and the first holding-shaft engaging portion 606 can fix the position of the throttle shaft 402 and is a desirable configuration. In particular, the throttle shaft 402 can be accurately fixed, such configuration is also desirable for attaching the throttle valve 400 to the throttle shaft 402.

However, the provision of the first holding-shaft engaging portion 606 on the first holding shaft 603 is not essential. The first holding shaft 603 and the second holding shaft 613 can be positioned by the first housing hole 602 of the first jig 600 and the second housing hole 612 of the second jig 610. Further, even when the first holding-shaft engaging portion 606 is provided on the first holding shaft 603, the shape of the first holding-shaft engaging portion 606 does not need to have a shape that can be engaged with the engaging portion 4021 formed at the end of the throttle shaft 402.

Further, in this embodiment, the second spring end 452 of the coil spring 450 close to the second guide 461 moves during the rotation from the valve intermediate position to the fully closed position. The first spring end 451 close to the first guide 460 moves during the rotation from the valve intermediate position to the fully open position. However, this movements of the coil spring 450 may be reversed.

Although the rotation direction of the motor 100 is also reversed, the operation is the same as this embodiment. In the present disclosure, the position of the first guide hook 468 is not specified by whether it is located close to the valve fully-open position or the valve fully-closed position.

Further, in the above example, the driving portion 2100 of the valve gear 210 is arranged between the first spring end 451 and the second spring end 452, and the driving portion 2100 is sandwiched and held between and by the first spring end 451 and the second spring end 452. Alternatively, as shown in FIG. 15, the driving portion 2100 of the valve gear 210 may be arranged outside the first spring end 451 and the second spring end 452. In other words, the first spring end 451 and the second spring end 452 of the coil spring 450 may be sandwiched and held between and by the first valve gear hook 2101 and the second valve gear hook 2102. In this case, the holding portion 3050 of the body 300 is also arranged outside the first spring end 451 and the second spring end 452. Therefore, the first spring end 451 and the second spring end 452 of the coil spring 450 are sandwiched and held by the first body hook 305 and the second body hook 307.

Further, in the above example, the first guide 460 and the second guide 461 have the same shape, so that the assembly time can be shortened, the assembly equipment cost can be reduced, and the component cost can be reduced. However, if it is necessary to make the shapes of the first guide 460 and the second guide 461 different in relation to the shapes of the valve gear 210 and the body 300, the shape change must be allowed. Even if the first guide hook 468 or the second guide hook 4681 cannot be formed on either one of the guides, the shape change must be allowed.

Further, the above-described materials and dimensions of the components are also examples, and may be appropriately selected according to the requirements for the electronic throttle device 1.

As described above, the throttle valve device according to the present disclosure may be applicable not only in an electronic throttle device for controlling an amount of intake air of an engine, but also, for example, an EGR valve controlling a circulation amount of exhaust gas, a intake-passage pressure control valve controlling an intake air of a diesel engine, and a negative pressure control valve controlling a hydrogen concentration of a fuel cell.

This specification discloses a plurality of technical ideas listed below and a plurality of combinations thereof.
(Technical Idea 1)
A throttle valve device comprising:
 a body (300) having a passage and a motor space;
 a valve (400) arranged in the passage of the body and configured to rotate together with a shaft (402) to open and close the passage;
 a motor (100) held in the motor space of the body and configured to operate according to an electric signal and rotate the shaft via rotation of a valve gear (210) such that the shaft is located at a valve fully-closed position at which the valve is fully closed, a valve fully-open position at which the valve is fully open, or a valve intermediate position which is between the valve fully-closed position and the valve fully-open position;
 a coil spring (450) arranged around an outer circumference of the shaft in the body and located between the valve gear and the valve, the coil spring having a first spring end extending outward in a radial direction of the coil spring at an end of the coil spring, and a second spring end extending outward in the radial direction at another end of the coil spring, the coil spring being configured to generate a spring force as an opposing force at a time of transmission of rotation from the motor to the shaft;
 a first guide (460) having a first through hole through which the shaft extends at a central position of the first guide, a first end surface (453) of the coil spring facing the first guide, the first guide being configured to rotate around the shaft together with the first spring end;
 a second guide (461) having a second through hole through which the shaft extends at a central position of the second guide, a second end surface (454) of the coil spring facing the second guide, the second guide being configured to rotate around the shaft together with the second spring end;
 a driving portion (2100) configured to be rotated together with the valve gear, the driving portion being in contact with the first spring end and the second spring end at the valve intermediate position of the shaft, the driving portion pushing the first spring end or the second spring end against the opposing force of the coil spring during a first movement of the shaft or a second movement of the shaft, the first movement being movement of the shaft from the valve intermediate position to the valve fully-closed position, the second movement being movement of the shaft from the valve intermediate position to the valve fully-open position; and
 a holding portion (3050) provided in the body, the holding portion being in contact with the first spring end and the second spring end at the valve intermediate position of the shaft, the holding portion holding the first spring end or the second spring end during the first movement or the second movement of the shaft, wherein:
 the first guide includes a first insertion hole (466), and the second guide includes a second insertion hole (4661), and
 an axis of the first insertion hole in an axial direction of the shaft and an axis of the second insertion hole in the axial direction are located at the same position when both the first spring end and the second spring end are positioned near the valve intermediate position of the shaft and are not in contact with the holding portion.
(Technical Idea 2)
A method for manufacturing a throttle valve device according to Technical Idea 1, comprising:
 using a first jig (600), the first jig including:
  a first holding shaft (603) that can be inserted into the first through hole of the first guide and the second through hole of the second guide,
  a jig pin (605) that can be inserted into the first insertion hole of the first guide and the second insertion hole of the second guide, and
  a first base portion (601) that houses the first holding shaft to be movable in the axial direction and fixes the jig pin;
 using a second jig (610), the second jig including:
  a second holding shaft (613) that can be inserted into the second through hole of the second guide, and
  a second base portion (611) that houses the second holding shaft to be movable in the axial direction;
 supporting the second guide with the second jig by inserting the second holding shaft into the second through hole;
 supporting the first guide, the coil spring and the second guide with the first jig and the second jig without a load on the coil spring, wherein the supporting without the load includes placing the coil spring between the second guide and the first guide, inserting the first holding shaft into the first through hole, and inserting the jig pin into the first insertion hole;

supporting the first guide, the coil spring and the second guide with the first jig under a load on the coil spring, wherein the supporting under the load includes rotating the first jig around the first holding shaft to cause the jig pin to face the second insertion hole, and compressing the coil spring to insert the jig pin into the second insertion hole and insert the first holding shaft into the second through hole;

removing the second jig from the first guide, the coil spring and the second guide in a state where the first jig supports the first guide, the coil spring and the second guide;

attaching the first guide, the coil spring and the second guide to the body by the first jig such that the first spring end and the second spring end face the holding portion without contacting the holding portion; and removing the first jig from the first guide, the coil spring and the second guide such that the first spring end and the second spring end come into contact with the holding portion by the spring force of the coil spring.

The throttle valve device according to Technical Idea 1, wherein:

at least one of the first insertion hole of the first guide or the second insertion hole of the second guide is an elongated hole extending in a circumferential direction centered on the shaft.

(Technical Idea 4)

The throttle valve device according to Technical Idea 1 or Technical Idea 3 depending from Technical Idea 1, wherein:

the first guide includes a first spring hole (465) through which the first spring end of the coil spring extends, and the second guide includes a second spring hole (4651) through which the second spring end of the coil spring extends.

(Technical Idea 5)

The throttle valve device according to Technical Idea 1 or Technical Idea 3 or 4 depending from Technical Idea 1, wherein:

an end of the shaft facing the valve gear has an engaging portion (4021), and the engaging portion engages with the valve gear such that the shaft is rotatable together with the valve gear.

(Technical Idea 6)

The method for manufacturing the throttle valve device, according to Technical Idea 2, wherein:

at least one of the first insertion hole of the first guide or the second insertion hole of the second guide is an elongated hole extending in a circumferential direction centered on the shaft.

(Technical Idea 7)

The method for manufacturing the throttle valve device according to Technical Idea 2 or Technical Idea 6 depending from Technical Idea 2, wherein:

the first guide includes a first spring hole (465) through which the first spring end of the coil spring extends, the second guide includes a second spring hole (4651) through which the second spring end of the coil spring extends, and the supporting without the load on the coil spring includes inserting the first spring end into the first spring hole, and inserting the second spring end into the second spring hole.

(Technical Idea 8)

The method for manufacturing the throttle valve device according to Technical Idea 2 or Technical Idea 6 or 7 depending from Technical Idea 6, wherein:

an end of the shaft facing the valve gear has an engaging portion (4021), and the second holding shaft includes a second holding-shaft engaging portion (616) that is the same in shape as the engaging portion, and the supporting without the load on the coil spring includes arranging the second holding-shaft engaging portion to be engaged with the first holding shaft of the first jig such that the second holding shaft is coaxial with the first holding shaft.

While the present disclosure has been described with reference to embodiments thereof, it is to be understood that the disclosure is not limited to the embodiments and constructions. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

What is claimed is:

1. A throttle valve device comprising:

a body having a passage and a motor space;

a valve arranged in the passage of the body and configured to rotate together with a shaft to open and close the passage;

a motor held in the motor space of the body and configured to operate according to an electric signal and rotate the shaft via rotation of a valve gear such that the shaft is located at a valve fully-closed position at which the valve is fully closed, a valve fully-open position at which the valve is fully open, or a valve intermediate position which is between the valve fully-closed position and the valve fully-open position;

a coil spring arranged around an outer circumference of the shaft in the body and located between the valve gear and the valve, the coil spring having a first spring end extending outward in a radial direction of the coil spring at an end of the coil spring, and a second spring end extending outward in the radial direction at another end of the coil spring, the coil spring being configured to generate a spring force as an opposing force at a time of transmission of rotation from the motor to the shaft;

a first guide having a first through hole through which the shaft extends at a central position of the first guide, a first end surface of the coil spring facing the first guide, the first guide being configured to rotate around the shaft together with the first spring end;

a second guide having a second through hole through which the shaft extends at a central position of the second guide, a second end surface of the coil spring facing the second guide, the second guide being configured to rotate around the shaft together with the second spring end;

a driving portion configured to be rotated together with the valve gear, the driving portion being in contact with the first spring end and the second spring end at the valve intermediate position of the shaft, the driving portion pushing the first spring end or the second spring end against the opposing force of the coil spring during a first movement of the shaft or a second movement of the shaft, the first movement being movement of the shaft from the valve intermediate position to the valve fully-closed position, the second movement being movement of the shaft from the valve intermediate position to the valve fully-open position; and a holding portion provided in the body, the holding portion being in contact with the first spring end and the second spring end at the valve intermediate position of the shaft, the holding portion holding the first spring end or the second spring end during the first movement or the second movement of the shaft, wherein the first guide includes a first insertion hole, and the second guide includes a second insertion hole, and an axis of the first insertion hole in an axial direction of the shaft and an axis of the second insertion hole in the axial direction are located at the same position when both the first spring end and the second spring end are positioned near the valve intermediate position of the shaft and are not in contact with the holding portion.

2. A method for manufacturing the throttle valve device according to claim 1, comprising:

using a first jig, the first jig including
  a first holding shaft that can be inserted into the first through hole of the first guide and the second through hole of the second guide,
  a jig pin that can be inserted into the first insertion hole of the first guide and the second insertion hole of the second guide, and
  a first base portion that houses the first holding shaft to be movable in the axial direction and fixes the jig pin;

using a second jig, the second jig including
  a second holding shaft that can be inserted into the second through hole of the second guide, and
  a second base portion that houses the second holding shaft to be movable in the axial direction;

supporting the second guide with the second jig by inserting the second holding shaft into the second through hole;

supporting the first guide, the coil spring and the second guide with the first jig and the second jig without a load on the coil spring, wherein the supporting without the load includes placing the coil spring between the second guide and the first guide, inserting the first holding shaft into the first through hole, and inserting the jig pin into the first insertion hole;

supporting the first guide, the coil spring and the second guide with the first jig under a load on the coil spring, wherein the supporting under the load includes rotating the first jig around the first holding shaft to cause the jig pin to face the second insertion hole, and compressing the coil spring to insert the jig pin into the second insertion hole and insert the first holding shaft into the second through hole;

removing the second jig from the first guide, the coil spring and the second guide in a state where the first jig supports the first guide, the coil spring and the second guide;

attaching the first guide, the coil spring and the second guide to the body by the first jig such that the first spring end and the second spring end face the holding portion without contacting the holding portion; and removing the first jig from the first guide, the coil spring and the second guide such that the first spring end and the second spring end come into contact with the holding portion by the spring force of the coil spring.

3. The method for manufacturing the throttle valve device, according to claim 2, wherein
at least one of the first insertion hole of the first guide or the second insertion hole of the second guide is an elongated hole extending in a circumferential direction centered on the shaft.

4. The method for manufacturing the throttle valve device, according to claim 2, wherein
the first guide includes a first spring hole through which the first spring end of the coil spring extends,
the second guide includes a second spring hole through which the second spring end of the coil spring extends, and
the supporting without the load on the coil spring includes inserting the first spring end into the first spring hole, and inserting the second spring end into the second spring hole.

5. The method for manufacturing the throttle valve device, according to claim 2, wherein
an end of the shaft facing the valve gear has an engaging portion, and
the second holding shaft includes a second holding-shaft engaging portion that is the same in shape as the engaging portion, and
the supporting without the load on the coil spring includes arranging the second holding-shaft engaging portion to be engaged with the first holding shaft of the first jig such that the second holding shaft is coaxial with the first holding shaft.

6. The throttle valve device according to claim 1, wherein
at least one of the first insertion hole of the first guide or the second insertion hole of the second guide is an elongated hole extending in a circumferential direction centered on the shaft.

7. The throttle valve device according to claim 1, wherein
the first guide includes a first spring hole through which the first spring end of the coil spring extends, and
the second guide includes a second spring hole through which the second spring end of the coil spring extends.

8. The throttle valve device according to claim 1, wherein
an end of the shaft facing the valve gear has an engaging portion, and
the engaging portion engages with the valve gear such that the shaft is rotatable together with the valve gear.

* * * * *